350-96.25
6/17/80    OR    4,208,096

United States Patent [19]
Glenn, Jr.

[11] 4,208,096
[45] Jun. 17, 1980

[54] OPTICAL DISPLAY APPARATUS

[75] Inventor: William E. Glenn, Jr., Fort Lauderdale, Fla.

[73] Assignee: New York Institute of Technology, Old Westbury, N.Y.

[21] Appl. No.: 881,671

[22] Filed: Feb. 27, 1978

Related U.S. Application Data

[62] Division of Ser. No. 745,187, Nov. 26, 1976, Pat. No. 4,116,739.

[51] Int. Cl.² .............................................. G02B 5/17
[52] U.S. Cl. ...................................... 350/96.25; 355/1
[58] Field of Search ................... 350/96.25; 353/27 R, 353/27 A, 120; 355/1, 46

[56] References Cited
U.S. PATENT DOCUMENTS

| 3,402,000 | 9/1968 | Crawford | 350/96.25 |
| 3,864,034 | 2/1975 | Yevick | 350/96.25 |

Primary Examiner—Stewart J. Levy
Attorney, Agent, or Firm—Martin Novack

[57] ABSTRACT

The disclosure pertains to an optical display apparatus, or fiber optics magnification panel, and a method of making same. The display apparatus comprises a light input surface defined by one end of each of a multiplicity of elongated optical carrier strands, e.g. fiber optic strands, the one ends being arranged in a relatively closely spaced array of rows and columns. A light output surface is substantially perpendicular to the light input surface and is defined by the other ends of the strands, the other ends being arranged in a relatively remotely spaced configuration of rows and columns. Each column of strands extends rearwardly from the input surface to a depth which depends upon the column's position in the order of columns. Each strand of a column bends sidewardly at its point of greatest depth to an orientation which is substantially parallel to the input surface. The strands of each column are of different length with each strand of a column terminating at a transverse position which depends upon its row order in the column, such that the other ends of the strands of the columns of the input surface define columns of the output surface which are at less than a right angle with respect to the columns of the input surface. The result is a compact wedge-shaped display apparatus.

5 Claims, 11 Drawing Figures

OPTICAL DISPLAY APPARATUS

This is a division of application Ser. No. 745,187, filed Nov. 26, 1976, now U.S. Pat. No. 4,116,739.

BACKGROUND OF THE INVENTION

This invention relates to the field of image magnification and display and, more particularly, to a fiber optics display panel and a method of making same.

Fiber optic image transferring, display, and magnification systems are known in a variety of forms. These systems typically employ large number of elongated filaments or strands of optically transmissive material which operate on a principle of total internal reflection. Light to be carried from one location to another enters the filament at one end and is internally reflected therein, even around fairly severe bends, with reasonably high efficiency so that most of the light is available at the exit end of the filament.

It is known that image magnification can be achieved by bunching the ends of a large number of optical fibers relatively closely together at one location to form an image input plane and separating the spacing between the other ends of the fibers at another reference plane, called the image exit plane. In this manner, the image can be "spread out" or magnified by an amount which depends on the ratio between the fiber spacings in the input plane and the fiber spacings in the output plane. Systems of this type are illustrated for example, in the U.S. Pat. Nos. 3,043,910; 3,402,000; 3,853,658; and 3,909,109. Systems of this general type can be provided with light absorbing material between the fiber ends in the output plane so as to enhance contrast. These systems are also advantageous in that they are essentially failure-free and have unlimited life. However, they tend to be relatively cumbersome since significant room is generally required to allow the optical filaments or fibers to spread out in a mechanically acceptable manner. Also, manufacturing cost of fiber optic magnification panels is a limiting factor on practicality. In particular, since large numbers of fibers are employed, it is important that the techniques of manufacture be relatively repeatable and accurate and not wasteful of material. The manufacturing process should also, ideally, not involve an unduly large number of manufacturing steps, and techniques which involve manipulation of individual fibers should ideally be avoided. However, it has been found in the past that the achievement of the most desirable geometries requires manufacturing techniques that tend to be expensive.

SUMMARY OF THE INVENTION

The present invention is directed to an optical display apparatus, or fiber optics magnification panel, and a method of making same. The display apparatus in accordance with the invention comprises a light input surface defined by one end of each of a multiplicity of elongated optical carrier strands, e.g. fiber optic strands, the one ends being arranged in a relatively closely spaced array of rows and columns. A light output surface is substantially perpendicular to the light input surface and is defined by the other ends of the strands, the other ends being arranged in a relatively remotely spaced configuration of rows and columns. Each column of strands extends rearwardly from the input surface to a depth which depends upon the column's position in the order of columns. Each strand of a column bends sidewardly at its point of greatest depth to an orientation which is substantially parallel to the input surface. The strands of each column are of different length with each strand of a column terminating at a transverse position which depends upon its row order in the column, such that the other ends of the strands of the columns of the input surface define columns of the output surface which are at less than a right angle with respect to the columns of the input surface. The result is a compact wedge-shaped display apparatus wherein the output surface array has its top row at a relative height substantially corresponding to the relative height of the top row of the input surface array and the output surface array has a bottom row at a relative height which substantially corresponds to the relative height of the bottom row of the input surface array.

In the preferred embodiment of the invented apparatus, the defined other ends of the optical carrier strands are bent so as to be substantially normal to the light output surface.

In accordance with an embodiment of the method of the invention, there are defined a number of steps by which a display apparatus of the type described can be fabricated without an unduly large number of manufacturing steps or undue manipulation of individual fibers. A plurality of substantially parallel relatively closely spaced optically conducting elongated strands, such as fiber optic strands, are wrapped about a spacer element. At least one additional spacer element is then positioned over the previously wrapped strands and the plurality of strands is rewrapped over the at least one additional spacer element in spiral fashion. The operation of positioning an additional spacer element over the previously wrapped strands and rewrapping the strands over the additional spacer element is then repeated a desired number of times. The resultant spirally wound construction is then severed substantially along the plane of the first-mentioned spacer element, and a resultant portion of this severing operation is angularly severed to form a pair of wedge-shaped display panels. In the preferred embodiment of the invention, the step of positioning at least one additional spacer element over the previously wrapped strands comprises positioning a pair of spacer elements on opposite sides of the previously wrapped strands. In this embodiment, the severing of the spirally wound construction substantially along the plane of the first-mentioned spacer element yields two substantially similar portions, and when these are angularly severed the result is four wedge-shaped display panels. The preferred embodiment of the method further comprises the steps of shifting the relative orientations of portions of each strand overlaying a spacer element during or after the wrapping sequence. This results in the ends of the strands at the light output surface of the panel being substantially normal to said light output surface.

Further features and advantages of the invention will become more readily apparent from the following detailed description when taken in conjunction with the accompanying drawings.

DESCRIPTION OF THE PREFERRED EMBODIMENT

Figure 1:
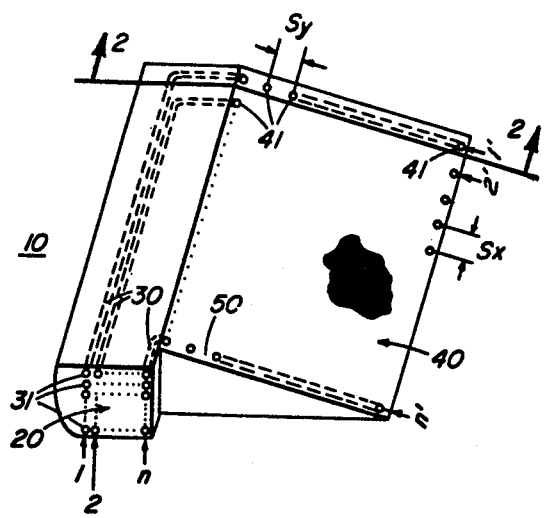
FIG. 1 is an elevational perspective view of the display apparatus in accordance with an embodiment of the invention.

Referring to FIG. 1, there is shown an optical display apparatus in accordance with an embodiment of the invention. The display apparatus 10 includes a light input surface 20 defined by one end 31 of each of a multiplicity of elongated optical carrier strands 30, such as fiber optic strands, the ends 31 being arranged in a relatively closely spaced array of rows and columns. In the present embodiment, the light input surface 20 is substantially planar, although it will be understood that this surface could vary to some extent from a planar configuration, such as to conform to the shape of a device from which an image is being transferred. A light output surface 40, substantially perpendicular to the light input surface 20, is defined by the other ends 41 of the fiber optic strands 30. The ends 41 are seen to be arranged in a relatively remotely spaced array of rows and columns. The fiber optic strands of the display apparatus 10 are disposed in a supportive material 50 the nature of which will be described further hereinbelow. In the figures the dashed lines generally indicate paths of the strands and dotted lines generally indicate the presence of array elements omitted from the drawings for illustrative clarity.

Figure 2:
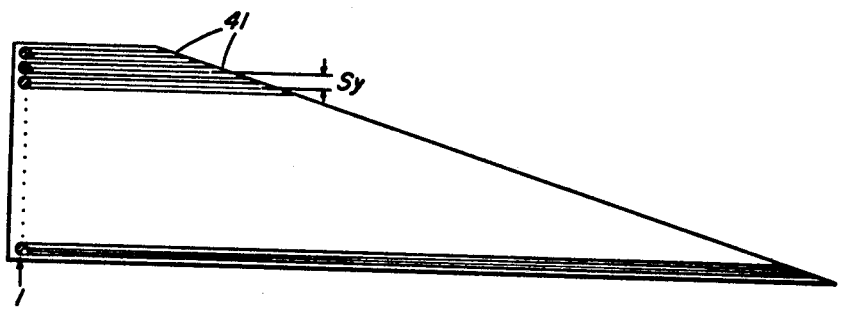
FIG. 2 is a cross-sectional view as taken through a section defined by the arrows 2—2 of FIG. 1.
Figure 3:
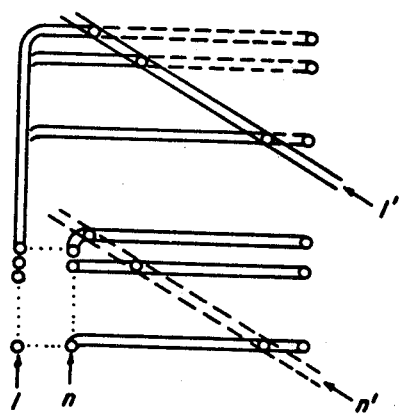
FIG. 3 is a diagrammatical view of some of the strands of the embodiment of FIG. 1 and is useful in understanding the configuration of the strands.

To better understand the configuration of the embodiment of FIG. 1, consider the leftmost column of strands of the input surface 20, this column being referred to as column 1 of the input surface. Each strand of this column of strands extends rearwardly to a depth (the term "depth" being with respect to the input surface 20) which is approximately defined by the rearmost edge of the output surface 40 (see FIG. 3). The other ends of the strands of column 1 define a column designated 1' in the array of the output surface 40. FIG. 2 is a cross section showing the strands of column 1 at about their point of rearmost extension, and it can be seen that each strand bends sidewardly at its point of greatest depth to an orientation which is substantially parallel to the input surface 20, the other ends of these strands constituting the column 1' of the output surface array. (The columns of the output surface are designated as "columns" due to their relationship with the columns of the input surface. To view them as columns in FIG. 1, the FIG. can be turned sideways such that column 1' is on the right.)

The next column of strands of the input surface, designated as column 2, extends rearwardly to a depth slightly less than the depth to which the column 1 strands extend, and, as before, each of these strands bends sidewardly at its point of greatest depth to an orientation which is substantially parallel to the input surface. Thus it is seen that each column of strands extends rearwardly from the input surface 20 to a depth which depends upon the column's position in the order of columns; viz, column 1 extending rearwardly by the greatest amount, column 2 extending rearwardly by the next greatest amount, . . . and the last column, designated column n, extending rearwardly the smallest amount.

It is seen from the above that each strand of a column bends sidewardly at its point of greatest depth to an orientation which is substantially parallel to the input surface. The strands of each column are of different length, with each strand of a column terminating at a transverse position which depends upon its row order in the column, such that the other ends (41) of the strands of the columns define columns of the output surface which are at less than a right angle with respect to the columns of the input surface, yielding a wedge-shaped panel. This is illustrated, for example, in FIG. 2 wherein it is seen that the top strand of column 1 terminates at a lesser transverse (or sideward) position than the second-from-the-top strand of column 1 which, in turn, terminates at a lesser transverse position than the third-from-the-top strand of column 1, etc. Accordingly, with each strand of a column terminating at a transverse position which depends upon its row order in the column, the elevation of the light output surface varies uniformly to yield a compact wedge-shaped display panel.

Figure 4A:
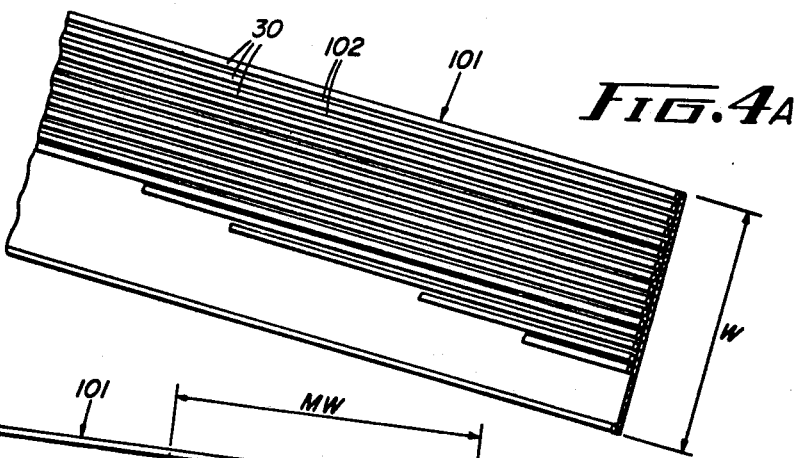
FIGS. 4A through 4E illustrate a method of making a display apparatus in accordance with the embodiment of the invention.

FIGS. 4A–4E illustrate the steps of an embodiment of a method in accordance with the invention for making a display panel of the type described in conjunction with FIG. 1. In accordance with the invented method, a plurality of relatively closely spaced optically conducting elongated strands, such as fiber optic strands in parallel configuration, are utilized. Since substantial lengths of these strands are employed, it is convenient to prepare a "ribbon" 101, such as is shown in FIG. 4A, which comprises a multiplicity of strands 30 in uniformly spaced parallel relationship supported on a carrier 102. The ribbon may be made available on a spool or in any other form from which substantial lengths thereof can be readily removed.

Figure 4B:
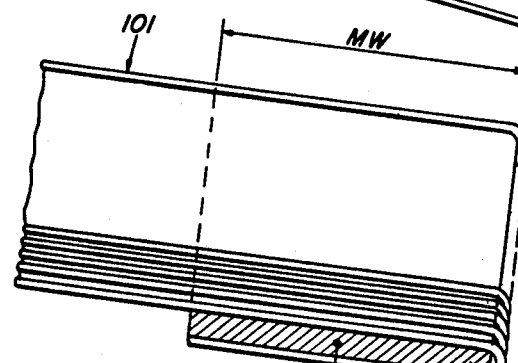
Figure 4C:
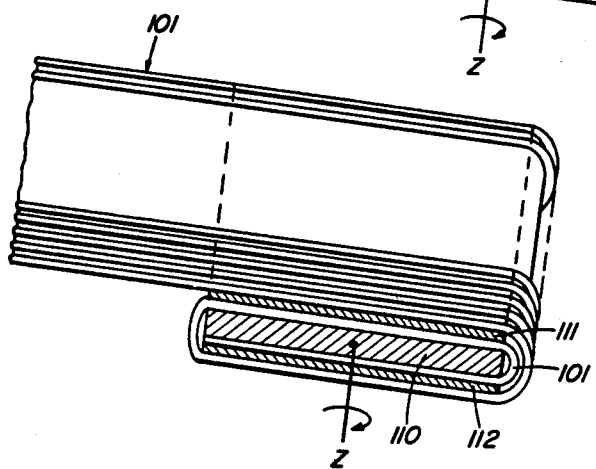
Figure 4D:
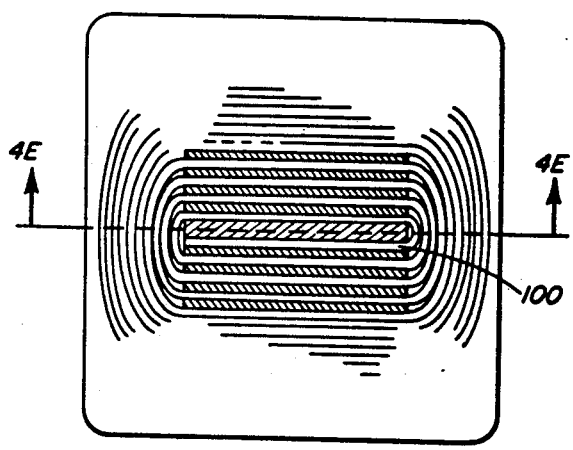
Figure 4E:
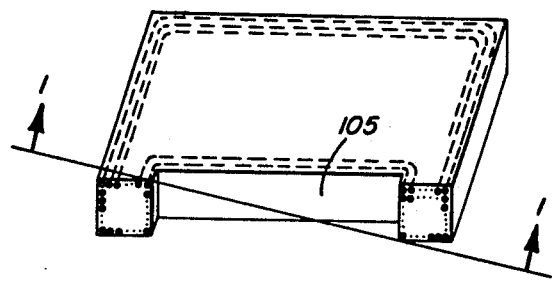

The ribbon 101 of fiber optic strands is wrapped about a relatively flat spacer element 110, as shown in FIG. 4B. In the embodiment of FIG. 4, this and subsequent wrapping operations are achieved by rotating the spacer element 110, which serves as a rotating platen, about an axis Z. It will be understood, however, that the wrapping operations could alternately be performed by moving the source of ribbon, such as a ribbon spool, in spiral fashion, around the spacer element. After the ribbon has been wrapped once around the spacer element 110, a suitable encasing or binder material, such as a plastic or resin, may be disposed on and between the strands 30. Additional relatively flat spacer elements are then positioned over the previously wrapped strands, the spacer element 111 being positioned over one exposed surface of the ribbon 101, and a spacer element 112 being positioned over the other exposed surface of the ribbon 101. The strands are then rewrapped over the additional spacer elements, such as by effecting an additional revolution of the platen 110 (FIG. 4C). The steps of adding additional spacer elements and subsequent spiral wrapping are then repeated a desired number of times to obtain a construction as is shown in side view in FIG. 4D. The construction is next severed along the plane of the first spacer element 110, as indicated by the arrows 4E—4E in FIG. 4D. Two identical portions, one of which is shown in FIG. 4E, are obtained. In the present embodiment, the platen 110 is reusable and would typically be removed before or during the severing of the construction of FIG. 4D so as to leave the groove designated 105 in FIG. 4E. In such case, before the additional wrapping of FIG. 4B, a pair of spacers may be positioned on opposite sides of the platen 110 and bound to the first wrapped strands, and these spacers will comprise the material on the wall of the groove 105 of each of the two portions of the severed construction. Each portion resulting from the severing of the construction of FIG. 4D, as shown in FIG. 4E, is then angularly severed along the section indicated by arrows 1—1 of FIG. 4E. This severing operation, which can be further visualized from the broken lines of FIG. 3, results in a pair of wedge-shaped display panels as originally shown in FIG. 1.

The distances between the strand ends of the light output surface array are designated $S_x$ and $S_y$, as labeled in FIG. 1. The spacing $S_x$ is determined by the thickness of the spacer elements plus the fiber thickness. The spacing $S_y$ can be seen to be determined from $$S_Y = (M \cdot W / N)$$

where W is the width of the ribbon of strands, M is the magnification factor, M·W is the length of the spacer element, and N is the number of strands in the ribbon. The magnification factor M, i.e. the ratio between the spacer element length and the ribbon width, is selected to achieve a desired degree of magnification. In one embodiment of the invention, a black paper having a thickness of M times the thickness of the ribbon is employed as the spacer elements, so as to achieve a magnification M in the $S_x$ direction. The use of a black material between the strands in the ribbon, as well as for the spacer material, facilitates the viewing of a magnified image in a relatively high ambient environment, since the strand output ends are surrounded by a larger light-absorbing, non-reflecting area which keeps ambient illumination from reaching the viewer of a displayed image. As noted, during manufacture, a suitable binder may be employed between the wrapped layers and then set or cured by heating prior to severing the construction. After the severing operations, each resultant display panel can be finished by suitable polishing, varnishing, or the like.

Figure 5A:
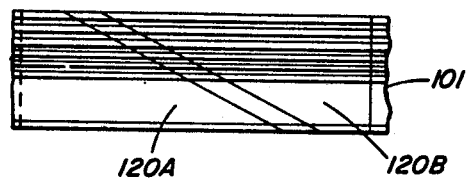
FIGS. 5A through 5C illustrate a method of making a display apparatus in accordance with an embodiment of the invention.
Figure 5B:
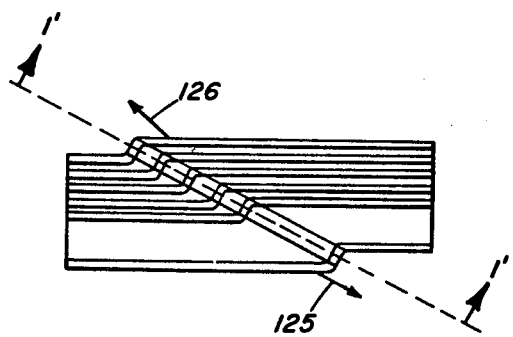
Figure 5C:
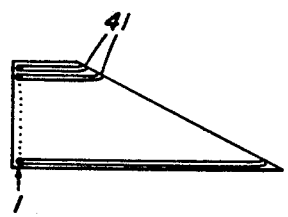

As seen in FIG. 2, the ends of the fiber optic strands at the output surface are not normal to the output surface itself. If the strands have very small diameters, the light emanating from them will be distributed relatively isotropically. However, if relatively large strands are utilized, it may be desired to orient the ends of the strands so that they are substantially perpendicular to the output surface. One way of achieving this is to utilize spacer elements that have a diagonally oriented gap, as shown in FIG. 5A, the gap corresponding to the position of the severing plane 1—1 of FIG. 4E. Once the ribbon 101 has been wrapped over the spacer element, the two segments of the spacer element, labeled 120A and 120B, are shifted slightly along the diagonally oriented reference, as represented by the arrows 125 and 126 in FIG. 5B. The magnitude of the shift is sufficient to orient the strands in the gap to be normal to a plane through the center of the gap. After this has been done, the gap is filled with a suitable material, such as an epoxy resin, and cured. When the construction is severed, such as along the lines 1'—1' in FIG. 5B, the result is as shown in FIG. 5C (contrast with FIG. 2). A convenient way of utilizing the technique of FIG. 5 is to provide a pair of split platens instead of the single platen 110 of FIG. 4B. The spacer segments, as shown in FIG. 5A, are stacked over the split platens during the winding sequence and secured thereto by any suitable means. At completion, the platens are shifted in the manner of FIG. 5B and this causes a shifting of all the spacer element segments. The steps of introducing the filler material and severing can then be performed as described.

The invention has been described with reference to particular embodiments, but variations within the spirit and scope of the invention will occur to those skilled in the art. For example, while it is preferred to stack spacer elements on both sides during the winding sequence so as to ultimately obtain four display panels, it will be understood that by stacking spacer elements on only one side, two display panels can be obtained from each construction. It will be further understood that the severing operations could be performed, in part, during the winding sequence. Also, it is noted that the display of FIG. 1 introduces a mirror image reversal of an input image, and suitable means can be employed to effect a cancelling pre-reversal. Finally, it will be understood that instead of winding partially or totally secured ribbons, single strands can be wound layer-by-layer.

I claim:

1. An optical display apparatus, comprising:
   a light input surface defined by one end of each of a multiplicity of elongated optical carrier strands, said one ends being arranged in a relatively closely spaced array of rows and columns; and
   a light output surface substantially perpendicular to said light input surface, said light output surface being defined by the other ends of said strands, said other ends being arranged in a relatively remotely spaced configuration of rows and columns;
   each column of strands extending rearwardly from said input surface to a depth which depends upon the column's position in the order of columns;
   each strand of a column bending sidewardly at its point of greatest depth to an orientation which is substantially parallel to said input surface;
   the strands of each column being of different length with each strand of a column terminating at a transverse position which depends upon its row order in the column, such that said other ends of the strands of the columns of the input surface define columns of the output surface which are at less than a right angle with respect to the columns of the input surface.

2. The apparatus as defined by claim 1 wherein the array of said output surface has its top row at a relative height substantially corresponding to the top row of said input surface array and said output surface array has a bottom row at a relative height which substantially corresponds to the relative height of the bottom row of said input surface array, such that said display apparatus is wedge-shaped.

3. The apparatus as defined by claim 1 wherein said other ends are bent so as to be substantially normal to said light output surface.

4. The apparatus as defined by claim 2 wherein said other ends are bent so as to be substantially normal to said light output surface.

5. The apparatus as defined by claim 1 wherein said other ends are disposed in a relatively low-reflection material.

* * * * *